Aug. 11, 1970     A. E. SYKES     3,523,693
HOLDING DEVICE

Filed June 21, 1967     3 Sheets-Sheet 1

INVENTOR.
ALFRED ERNEST SYKES

BY
Woodard, Weikart, Emhardt & Naughton
Attorneys

Aug. 11, 1970  A. E. SYKES  3,523,693
HOLDING DEVICE
Filed June 21, 1967  3 Sheets-Sheet 2
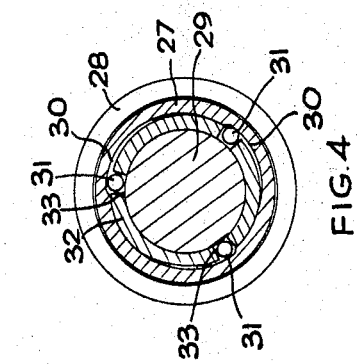
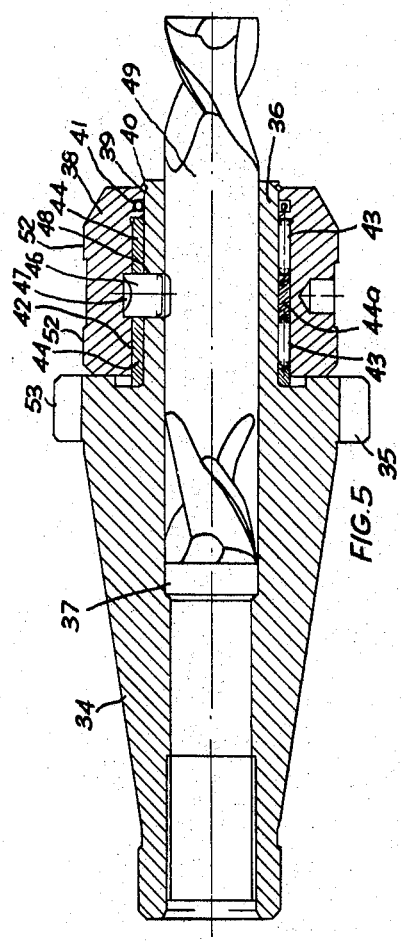
INVENTOR.
ALFRED ERNEST SYKES
BY Woodard, Weikart, Emhardt & Naughton
Attorneys Aug. 11, 1970    A. E. SYKES    3,523,693
HOLDING DEVICE
Filed June 21, 1967      3 Sheets-Sheet 3
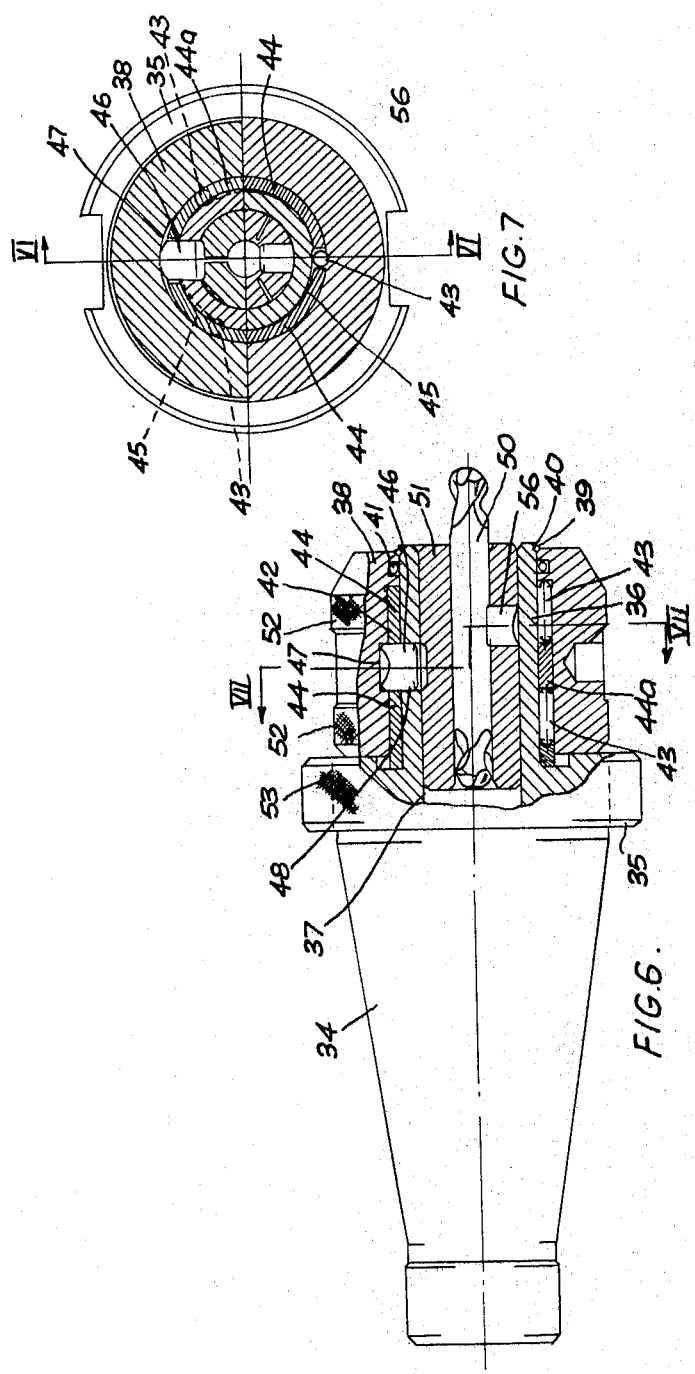
INVENTOR
ALFRED ERNEST SYKES
BY
Woodard, Weikart, Emhardt & Naughton
Attorneys United States Patent Office 3,523,693
Patented Aug. 11, 1970

3,523,693
HOLDING DEVICE
Alfred Ernest Sykes, 329 Leicester Road,
Markfield, Leicester, England
Filed June 21, 1967, Ser. No. 647,839
Int. Cl. B23b 31/12
U.S. Cl. 279—9          2 Claims

ABSTRACT OF THE DISCLOSURE

A holding device applicable as an internal or external arbor for withstanding torque wherein an outer hollow member or inner co-axial member contain regular spaced rollers between them uniformly spaced around the axes of the members and engaging with cam rises on one of the members so that turning movement between the outer and inner members causes local displacement of the outer or a hollow inner member to cause it to grip a hollow part or stem of a tool or workpiece. The clamping device is combined with gripping dogs to provide positive engagement to withstand torque.

---

This invention is for an improved holding device suitable for use as an internal or external arbor and adapted to enable a tool or workpiece to be held on a centre against turning movement relatively to a fixed or rotatable supporting means. The invention has for an object to provide a holding device of this character which provides for strong gripping of the part to be held while permitting the part also to be positioned on its holder with a high degree of accuracy. Such holding of a part may be required for the purpose of performing a machining or inspecting operation.

In practicing the invention there may be provided a robust bush or sleeve mounted co-axially within or around a solid reactor member, means being provided to apply localised distortion to the bush or sleeve at positions spaced uniformly around its axis to cause it to grip the part to be held. By a camming action balanced around the axis of the bush or sleeve during a relative turning movement between the bush or sleeve and the reactor member, radial stresses are set up at positions uniformly spaced around said axis causing the bush or sleeve to undergo local radial displacement sufficient to cause it to engage firmly against the part to be held and grip it tightly. Depending on the type of holder to which the invention is applied i.e. to an internal holder (e.g. a mandrel) or an external holder (e.g. a chuck) the bush or sleeve has its distortions caused to take place outwardly or inwardly.

Advantageously there may be combined with the gripping action of the bush or sleeve a direct gripping of the part to be held by means of jaws or dogs which are moved outwardly or inwardly for their gripping movement and may grip the part to be held in a centralised condition before the bush or sleeve aforesaid is fully stressed.

Accordingly the invention in one practical form provides in a clamping device for withstanding torque, the combination comprising an outer hollow member, an inner member extending co-axially therein, said members presenting between them an annular space divided at positions spaced regularly around their axes into a plurality of sections tapering in thickness in the same circumferential direction as viewed endwise, rollers fitted at least one in each of said sections and each having an interference fit with the surface of said inner and outer members when in the part of its section of maximum thickness, one of said members forming a reaction member and the other a tubular clamping member capable of local distortion, and means permitting application of relative turning movement between said members whereby to cause the rollers to be squeezed and exert radial pressure on the clamping member to distort it. The holding device may include a roller cage interposed between said members with clearance for turning movement between them and having slots formed in it to accommodate the rollers.

The invention includes a tool or work holding device for holding a tool or workpiece in a torque resisting manner, the combination comprising inner and outer co-axial members, one forming a solid reactor member and the other a tubular holding member capable of local displacement for gripping a tool or workpiece, said members presenting an annular space between them and one member having a cylindrical surface while the other has an opposed surface presenting a succession of circumferentially extending cam surfaces sloping in the same direction from positions uniformly spaced around the axis of the members, a plurality of rollers, at least one for each cam surface, interposed between the members and engaging with the respective cam surfaces each with an interference fit at the positions of greatest spacing between the members and means whereby one of the members may be turned relatively to the other to cause the rollers to move up the cam surface and locally displace the tubular holding member. As above indicated the rollers may conveniently be carried in a cage between the members to maintain them in the required uniform spacing around the axis of the holding device.

Advantageously in carrying out the invention the holding device comprises additional holding means having at least one radially movable jaw or dog member forming a quick acting clamp for the part to be held and means for actuating the dog member in such manner that its gripping means can be caused to be effective before the gripping action of the rollers is fully applied.

The invention has convenient application to a chuck having a shank from which there projects a tubular flange part between which and an outer concentric reactor sleeve the rollers aforesaid are engaged to act on the flange part in such manner that by turning the reactor sleeve the flange part is compressed and displaced radially at uniformly spaced positions around it to cause it to grip the part to be held such as a tool or workpiece or a collet in which the tool or workpiece is held. The chuck may have a jaw or jaws operated by quick action cam means which will operate first of all to grip the part to be held, the flange part then having its portions displaced to press firmly against the part the be held thus centralising it in a rigid manner.

Certain convenient forms of construction applicable to a chuck or mandrel device are illustrated by way of example in the accompanying drawings and will now be described with reference to the drawings in which, FIG. 1 is a side elevation view partly in central cross section of a chuck in accordance with the invention for holding a tool or workpiece;

FIG. 4 is a view corresponding to FIG. 3 but illustrating an inversion of the arrangement of FIGS. 1 to 3;

FIG. 5 is a side view in central cross section showing a further form of chuck suitable for supporting a double ended cutter;

FIG. 6 is a view corresponding to FIG. 5 but showing a smaller cutter engaged in the chuck, this view being a cross section taken on the line VI—VI of FIG. 7; and FIG. 7 is an end view in cross section taken on the line VII—VII of FIG. 6.

Figure 1:
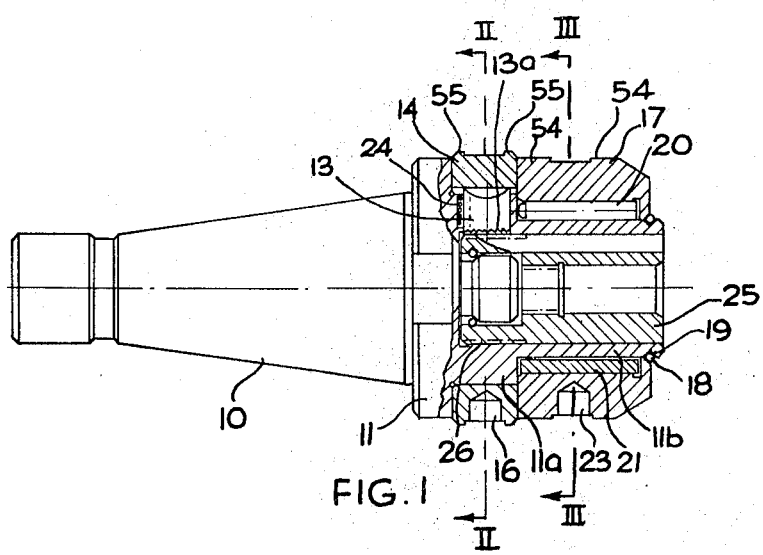
Figure 2:
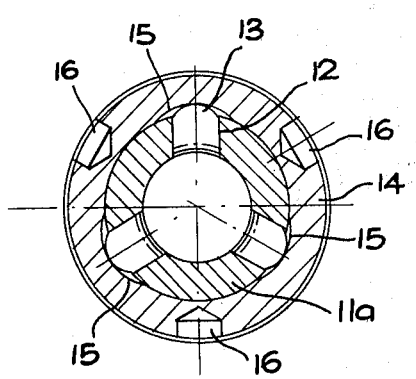
FIG. 2 is an end view in cross section taken on the line II—II of FIG. 1.
Figure 3:
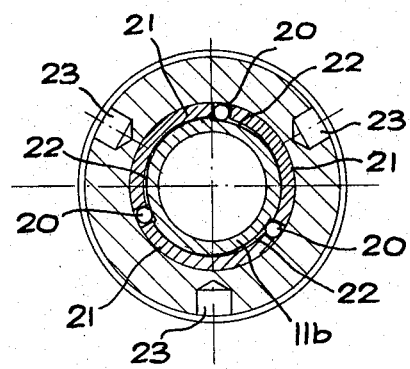
FIG. 3 is an end view in cross section taken on the lines III—III of FIG. 1.

Referring firstly to FIGS. 1 to 3 the chuck comprises a hardened body having a tapered shank 10 and a spigot or tubular flange part 11. The flange part 11 is stepped in outside diameter firstly to a part indicated at 11a and then to a part 11b of smaller outside diameter forming a rigid sleeve having accurately ground internal and external surfaces. At three positions uniformly spaced around the chuck axis the part 11a is formed with radial throughways 12, three being shown, each containing a radially movable gripper jaw or dog 13. Around the part 11a there is a ring 14 formed with short circumferentially extending cam depressions 15 to engage the rounded outer ends of the gripper dogs 13. The inner ends of the latter have screw threaded curved faces indicated at 13a for engagement with a tool or workpiece, the screw thread being such as to mate with the thread conventionally formed on the stem of a milling cutter or collet. In the ring 14 there are formed external recesses 16 for engagement by a C-spanner. The dogs 13 are urged outwardly by springs 24 contained in pockets formed partly in flange part 11a.

Around the part 11b of the spigot of the chuck there is rotatably mounted a hardened ring or sleeve 17 which had sliding engagement with the ring 14 and is retained in position endwise by a circlip or similar device 18, fitted in a circumferential recess 19 in the free end portion of the part 11b. The circlip 18 thus holds the rings 14 and 17 in place. The sleeve 17 can also bear against the outer part of the stepped portion 11a of the flange part 11. The sleeve 17 is of solid construction and forms a reactor member. Between the part 11b of the chuck and the sleeve 17 there is presented a circumferential space in which are mounted at intervals hardened parallel sided rollers 20 of which there are three in the construction shown uniformly spaced around the axis and retained in longitudinal slots formed in a sleeve 21 forming a roller cage. The internal surface of sleeve 17 is accurately ground to cylindrical form co-axial with the chuck body while the external surface of the tubular part 11b has three uniformly spaced and corresponding cam slants formed on it as indicated at 22 extending around the chuck axis. The parts are so dimensioned that when the rollers 20 are positioned at the lowest parts of the cam slants 22 there is an interference fit between the rollers and the parts 17 and 11b. Thus when the parts 17 and 11b are relatively turned in the direction to cause clockwise movement of the member 17 relatively to member 11b, as viewed in FIG. 3, the rollers 20 will move up the cam slopes 22 and exert a radial force between the parts 17 and 11b. This will cause local inward resilient displacement or distortion of the tubular part 11b to form what may be termed lobe like protuberances pressing inwardly to grip the tool or workpiece. The sleeve 17 is formed at three positions around its circumference with external recesses or sockets 23 for engagement by a C-spanner or other manipulating tool.

Although in the construction of FIGS. 1 to 3 the rings or sleeves 14 and 17 are shown as separate parts they may if desired be combined as a unitary part.

In the use of the chuck construction of FIGS. 1 to 3 the stem of a cutter tool (or of a workpiece) is fitted within the flange parts 11a and 11b, either as a direct fit, if of suitable size, or by means of an intermediate collet such as is indicated at 25 in FIG. 1, and the ring 14 is first turned to close the dogs 13 onto the screwthreaded end part of the tool or collet, such end part of a collet being indicated at 26 in FIG. 1. This will centralize the end of the tool and hold it to withstand torque and after this the ring or sleeve 17 is turned in the clockwise direction as seen in FIG. 3 thereby causing the rollers 20 to roll up the cam slopes 22 and due to reaction from the ring or sleeve 17 they will cause the flange part 11b to be locally deflected inwardly to grip the stem of the tool firmly, thus centralizing the tool in a rigid manner. Release of the tool is of course effected when required by turning the sleeve 17 and ring 14 in the opposite directions so as to release the flange part 11b and dogs 13 from engagement with the tool or collet. In the case in which the ring 14 and the sleeve 17 are formed integrally with one another their initial turning movement in the clockwise direction as seen in FIGS. 2 and 3 will cause the dogs 13 to engage with the tool or collet before sufficient stress is applied to the flange part 11b to deflect it inwardly into engagement with the tool or collet and subsequent movement of the integral parts 14 and 17 will effect the gripping of the tool along its stem portion by the flange part 11b.

For convenience in understanding the possibility of inversion of the clamping action of the sleeve part 11b in FIGS. 1 and 3, FIG. 4 shows an alternative arrangement in cross section, in which a flange part indicated at 27 is arranged to be pressed outwardly at locations uniformly spaced around its circumference to grip within the bore of a tubular part 28 of an article to be held centrally in position. In this case the flange part 27 has mounted centrally within it a solid cylindrical reactor member 29 between the hardened and ground cylindrical surface of which and a succession of circumferentially extending cam slopes 30 formed on the interior of the flange part 27 there are positioned rollers 31. In the inoperative position of the parts the rollers 31 have an interference fit with both the flange part 27 and the reactor member 29 at the widest space presented between the cam faces 30 and the cylindrical periphery of the member 29. The part 29 is arranged to be turned clockwise as seen in FIG. 4 relatively to the flange part 27 to effect gripping of the tubular part 28, this being effected by the rollers 31 running along the cam faces 30 so that by reaction from the member 29 spaced parts of the flange part 27 along the length of the rollers are forced outwardly into gripping and centralizing engagement with the tubular part 28 which is thereby firmly held in an accurately centralized position, with the holding device operating in this case as a mandrel. As before the rollers are conveniently mounted in a cage 32 formed with appropriately spaced slots 33 to accommodate the rollers.

FIGS. 5 to 7 illustrate the application of the invention to a chuck suitable for use with a double ended cutting tool such as a milling cutter. The chuck has a tapered body 34 with a flange part 35 and reduced sleeve like flange 36. As before the chuck body is of hardened material and the internal and external surfaces of the flange part 36 are ground accurately to shape, the interior being of cylindrical form. The bore of the flange part 36 is continued along into the tapered part 34 as indicated at 37 so as to accommodate the cutting end part of a double ended tool that is not in use. Surrounding the flange part 36 is a reactor sleeve 38 of hardened material having an accurately ground internal cylindrical bore. The sleeve 38 is located on the chuck endwise against the outer face of the flange 35 by means of a circlip 39 or similar locating means engaging a groove 40 in the end of flange part 36. The sleeve 38 may also be fitted with an anti-friction bearing 41 at its outer part which has a turning fit on the outer end of the flange part 36. More inwardly the sleeve 38 has an internal cylindrical surface indicated at 42 which is spaced from the exterior of the flange part 36 to accommodate three uniformly spaced pairs of rollers 43 corresponding to the rollers 20 of FIG. 1 the rollers in each pair being separated by a central spacing ring 44a. These rollers are housed in slotted cages 44 similar to the cage 21. As in the case of the flange part 11b of FIG. 1 the flange part 36 is formed with cam faces 45 and the rollers 43 have an interference fit between the flange part 36 and the sleeve 38 when at the lowest parts of the cam slopes 45. Thus when the sleeve 38 is turned clockwise as seen in FIG. 7 the rollers 43 will turn and roll up the cam slopes 45 to apply an inward radial stress to the flange part 36 until the latter is deflected locally inwardly along the positions of the rollers 43 to grip the tool in an accurately centralized manner.

In the construction of FIGS. 5 to 7 there is also provided a jaw or dog 46 to co-operate with a short cam depression 47 formed internally in the sleeve 38. The dog 46 is slidable radially in a throughway 48 formed in the flange part 36 and an appropriate slot in cage 44 and may be urged outwardly by a pocketed spring (not shown) as in the case of each of the dogs 13 of FIG. 1 to 3. The dog 46 forms a similar function to the dogs 13 being moved inwardly to engage and grip the central part of the double ended tool or a collet in which it is mounted before the full gripping action caused by the rollers 43 running on the cam tracks 45 occurs.

FIG. 5 shows a double ended cutter tool 49 having a stem diameter of a size suitable to fit directly into the bore of the flange part 36 and be engaged by the dog 46 and flange part 36 for the gripping action of these parts. On the other hand FIGS. 6 and 7 show a double ended cutter tool 50 of smaller diameter mounted in a collet 51 which is engaged by the dog 46 and flange part 36.

The exterior of the reactor sleeve 38 and the flange 35 may be formed with raised knurled portions 52 and 53 to assist in their manipulation when required. Similar raised milled portions in the construction of FIG. 1 are indicated at 54 and 55.

In the collet shown in FIGS. 6 and 7 there is a driving dog or slug 56 freely movable radially and formed of the exact length to engage a flat on the tool 50 when the collet 51 is inserted in the flange part 36.

What I claim is:

1. In a holding device for holding an element in a torque resisting manner, the combination comprising inner and outer coaxial members, one forming a solid reactor member and the other a closed tubular holding member capable of local displacement for gripping an element, said members presenting an annular space between them and one of said members having a cylindrical surface while the other has an opposed surface presenting a succession of circumferentially extending cam surfaces sloping in the same direction from positions uniformly spaced around the axis of the members, a plurality of rollers, at least one for each cam surface, interposed between the members and engaging with the respective cam surfaces each with an interference fit at the positions of greatest spacing between the members, means whereby one of the members may be turned relatively to the other to cause the rollers to move up the cam surfaces and locally displace the tubular holding member, additional holding means comprising at least one radially movable dog member forming a quick action clamp for the element to be held, and means for actuating the dog member in such manner that its gripping means can be caused to be effective before the gripping action of the rollers is fully applied.

2. In a holding device for holding an element in a troque resisting manner, the combination comprising inner and outer coaxial members, one forming a solid reactor member and the other a closed tubular holding member capable of local displacement for gripping an element, said members presenting an annular space between them and one of said members having a cylindrical surface while the other has an opposed surface presenting a succession of circumferentially extending cam surfaces sloping in the same direction from positions uniformly spaced around the axis of the members, a plurality of rollers, at least one for each cam surface, interposed between the members and engaging with the respective cam surfaces each with an interference fit at the positions of greatest spacing between the members, means whereby one of the members may be turned relatively to the other to cause the roller to move up the cam surfaces and locally displace the tubular holding member, a chuck body including a tubular flange part forming the said tubular holding member and having an outer sleeve forming the said solid reactor member, said chuck body being formed with a bore extending inwardly from the tubular flange part to accommodate one end of a double ended cutting tool whereby the tubular flange part of the body is adapted to cooperate with and grip the central part of the tool between its cutting ends, an additional holding means comprising a radially movable dog member mounted in a throughway formed in the tubular flange part at a position interposed in the circumferential direction between two rollers and cooperating with a cam recess formed internally in the outer sleeve so positioned that the dog member is moved inwards before the full clamping action of the rollers occurs.

References Cited
UNITED STATES PATENTS

| | | | |
|---|---|---|---|
| 1,514,641 | 11/1924 | Urquhart | 279—30 X |
| 2,408,503 | 10/1946 | Young | 279—2 |
| 2,603,496 | 7/1952 | Richert | 279—71 |
| 2,573,928 | 11/1951 | Peter | 279—2 |
| 2,972,486 | 2/1961 | Better | 279—2 |

LESTER M. SWINGLE, Primary Examiner

U.S. Cl. X.R.

279—71